United States Patent
Choi et al.

(10) Patent No.: US 8,089,522 B2
(45) Date of Patent: Jan. 3, 2012

(54) SPATIAL-TEMPORAL MULTI-RESOLUTION IMAGE SENSOR WITH ADAPTIVE FRAME RATES FOR TRACKING MOVEMENT IN A REGION OF INTEREST

(75) Inventors: Jaehyuk Choi, Minneapolis, MN (US); Euisik Yoon, Plymouth, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 1152 days.

(21) Appl. No.: 11/851,957

(22) Filed: Sep. 7, 2007

(65) Prior Publication Data

US 2009/0066782 A1   Mar. 12, 2009

(51) Int. Cl.
*H04N 5/235* (2006.01)
*H04N 3/14* (2006.01)
*H04N 3/28* (2006.01)

(52) U.S. Cl. ............ 348/222.1; 348/206; 348/294; 348/302; 348/308

(58) Field of Classification Search .............. 348/25, 348/59, 206, 222.1, 294, 302, 308
See application file for complete search history.

(56) References Cited

U.S. PATENT DOCUMENTS

| | | | |
|---|---|---|---|
| 5,949,483 A | | 9/1999 | Fossum et al. |
| 6,057,539 A | | 5/2000 | Zhou et al. |
| 6,118,482 A | | 9/2000 | Clark et al. |
| 6,977,685 B1 | | 12/2005 | Acosta-Serafini et al. |
| 7,075,049 B2 * | | 7/2006 | Rhodes et al. ........ 348/E3.019 |
| 7,630,008 B2 * | | 12/2009 | Sarwari ............... 348/296 |
| 7,964,929 B2 * | | 6/2011 | Fan .................... 348/308 |
| 2003/0210334 A1 * | | 11/2003 | Sarwari ............... 348/222.1 |
| 2005/0057675 A1 | | 3/2005 | Lee et al. |
| 2005/0110093 A1 * | | 5/2005 | Altice et al. ........... 257/359 |
| 2006/0192876 A1 * | | 8/2006 | Sarwari ............... 348/308 |
| 2009/0053848 A1 * | | 2/2009 | Fan .................... 438/59 |

OTHER PUBLICATIONS

S. Lauxtermann et al., "A High-Speed CMOS Imager Acquiring 5000 Frames/Sec," IEDM Technical Digest, pp. 36.3.1-36.3.4, Dec. 5-8, 1999.
A.I, Krymski et al., "A High-Speed, 240-Frames/s, 4.1-Mpixel CMOS Sensor," IEEE Transactions on Electron Devices, vol. 50, No. 1, pp. 130-135, Jan. 2003.
A.I. Krymski et al., "A 9-V/Lux-s 5000-Frames/s 512×512 CMOS Sensor," IEEE Transactions on Electron Devices, vol. 50., No. 1, pp. 136-143, Jan. 2003.

(Continued)

*Primary Examiner* — Quang N. Nguyen
(74) *Attorney, Agent, or Firm* — Shumaker & Sieffert, P.A.

(57) ABSTRACT

A sensor includes an array of pixels to capture an image, the array of pixels arranged as a plurality of pixel groups, each of the pixel groups having a two or more pixels coupled to a shared floating diffusion node for outputting merged image signals from the pixel groups, at least one inter-pixel switch to control transfer of electrical charge from a floating diffusion node for a first one of the pixel groups to a floating diffusion node for a second one of the pixel groups to temporarily store a portion of a previous image frame within the floating diffusion node for the second one of the pixel groups, and a motion comparator to compare an image signal from the first one of the pixel groups with an image signal from the second one of the pixel groups to detect motion between a current frame and the previous frame.

17 Claims, 17 Drawing Sheets

OTHER PUBLICATIONS

S. Kleinfelder et al., "A 10 000 Frames/s CMOS Digital Pixel Sensor," IEE Journal of Solid-State Circuits, vol. 36, No. 12, pp. 2049-2059, Dec. 2001.

S.Y. Ma et al, "A Single-Chip CMOS APS Camera with Direct Frame Difference Output," IEEE Journal of Solid-State Circuits, vol. 34, No. 10, pp. 1415-1418, Oct. 1999.

U. Mallik et al., "Temporal Change Threshold Detection Imager," 2005 IEEE International Solid-State Circuits Conference, Digest of Technical Papers, pp. 362-363, Feb. 2005.

O. Schrey et al., "A 1K×1K High Dynamic Range CMOS Image Sensor With On-Chip Programmable Region-of-Interest Readout," IEEE Journal of Solid-State Circuits, vol. 39, No. 7, pp. 911-915, Jul. 2002.

Y. Sugiyama et al., "A High-Speed, Profile Data Acquiring Image Sensor," 2005 IEEE International Solid-State Circuits Conference, Digest of Techical Papers, pp. 360-361, Feb. 2005.

Z. Zhou et al., "A CMOS Imager with On-Chip Variable Resolution for Light-Adaptive Imaging," ISSCC Digest of Technical Papers, pp. 174-175, Feb. 1998.

S.E. Kemeny et al., "Multiresolution Image Sensor," IEEE Transactions on Circuits and Systems for Video Technology, vol. 7, No. 2, pp. 575-583, Aug. 1997.

S. Lauxtermann et al., "A Megapixel CMOS Imager with Charge Binning," Proc. SPIE, vol. 4306, pp. 85-92, May 2001.

E. Artyomov et al., "Morton (Z) Scan Based Real-Time Variable Resolution CMOS Image Sensor," IEEE Transactions on Circuits and Systems for Video Technology, vol. 15, No. 7, pp. 947-952, Jul. 2005.

K.H. Lee, "A CMOS Active Pixel Sensor with Controlled Reset and Spatial-Temporal Multi-Resolution Readout," Ph.D. Dissertation, Dept. Elect. Eng., KAIST, Daejeon, Korea, 99 pages, 2004.

K.H. Lee, "A CMOS Image Sensor with Reset Level Control Using Dynamic Reset Current Source for Noise Suppression," 2004 IEEE International Solid-State Circuits Conferece, 2004 Digest of Technical Papers, 10 pages, Feb. 15-19, 2004.

M. Mori et al., "¼-Inch 2-Mpixel MOS Image Sensor With 1.75 Transistors/Pixel," IEEE Journal of Solid-State Circuits, vol. 39, No. 12, pp. 2426-2430, Dec. 2004.

S.W. Han et al., "A High Dynamic Range CMOS Image Sensor with In-Pixel Floating-Node Analog Memory for Pixel Level Integration Time Control," 2006 Symposium on VLSI Circuits of Technical Papers, pp. 31-32, Jun. 2006.

D. Senderowicz et al., "Low-Voltage Double Sampled Σ Δ Converters," IEEE Journal of Solid-State Circuits, vol. 32, No. 12, pp. 1907-1919, Dec. 1997.

B. Pain et al., "Dynamically Reconfigurable Vision with High Performance CMOS Active Pixel Sensors (APS)," IEEE Sensors Conference, pp. 1-6, Jun. 10-12, 2002.

E. Artyomov et al., "Morton (Z) Scan Based Real-Tim Variable Resolution CMOS Image Sensor," IEEE Transactions on Circuits and Systems for Video Technology, vol. 15, No. 7, pp. 947-952, Jul. 2005.

J. Choi et al, "A Spatial-Temporal Multi-Resolution CMOS Image Sensor With Adaptive Frame Rates for Moving Objects in the Region-Of-Interest," ISSCC 2007/Session 28/Image Sensors/28.2, pp. 6-8, 2007.

* cited by examiner

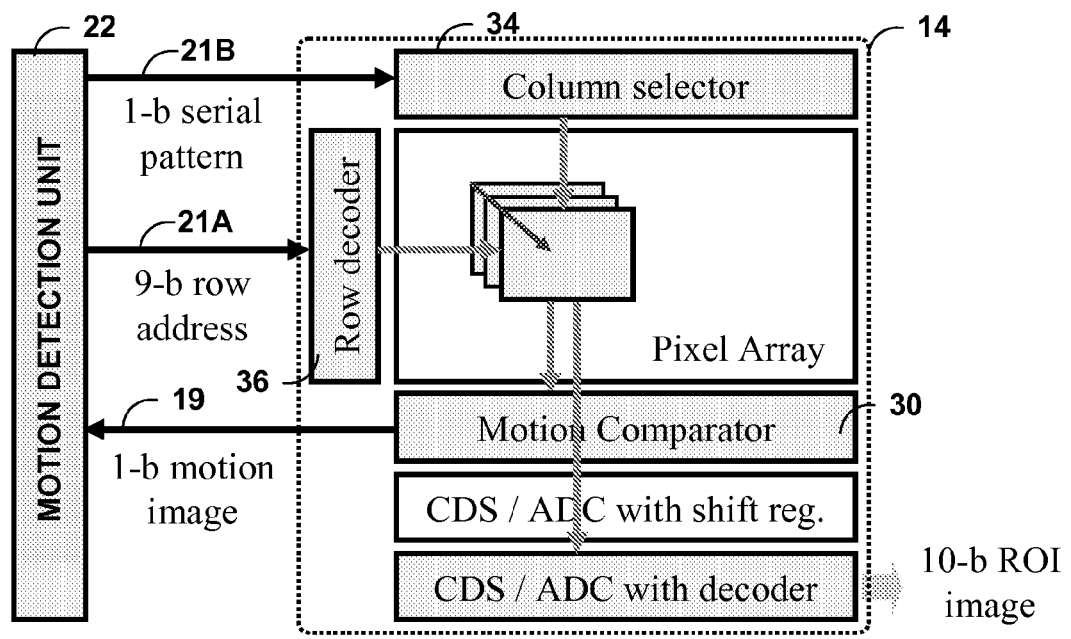
FIG. 7
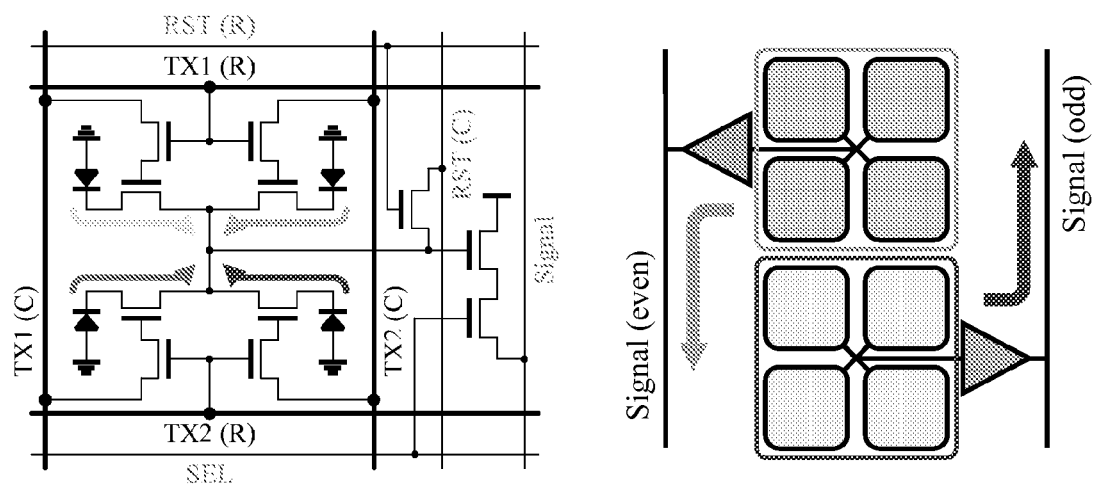
FIG. 8A     FIG. 8B

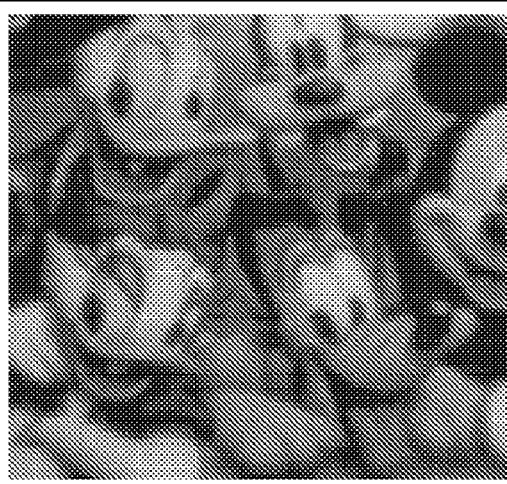
FIG. 19A
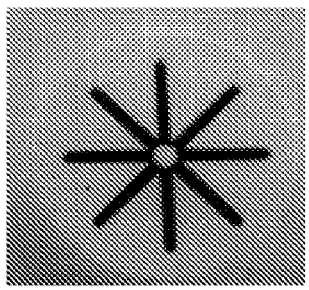
FIG. 19B
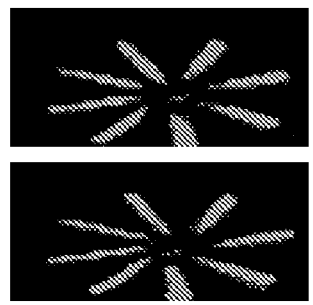
FIG. 19C
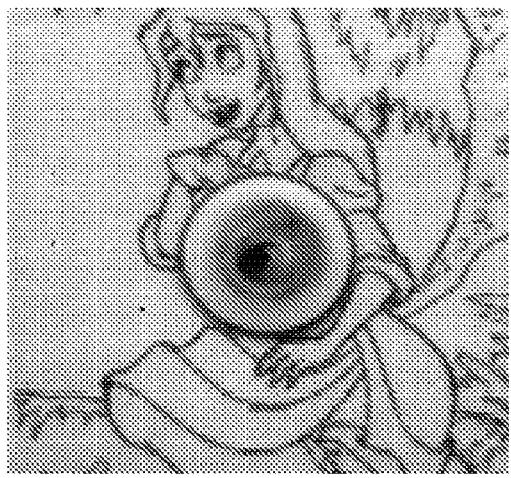
FIG. 19D
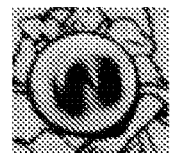
120 fps
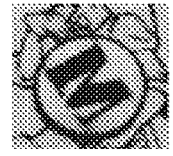
240 fps
FIG. 19E
FIG. 19F

SPATIAL-TEMPORAL MULTI-RESOLUTION IMAGE SENSOR WITH ADAPTIVE FRAME RATES FOR TRACKING MOVEMENT IN A REGION OF INTEREST

TECHNICAL FIELD

The invention relates to image and video processing, and more particularly, to high-speed image sensors.

BACKGROUND

Many applications require capturing an image of fast moving objects without distortion. Example applications are surveillance systems, traffic cameras, robotic visions, destruction testing, and scientific experiments. One problem in the imaging of fast moving objects is motion-blur, since the trace of moving objects is integrated in a frame. To get a sharp image without any motion-blur, high-speed imaging with a short integration time may be needed. Consequently, this may require high-speed readout at the cost of high bandwidth.

A complementary metal-oxide-semiconductor (CMOS) image sensor may have an advantage in high-speed readout as compared with charge coupled devices (CCDs), because the readout operation of a CMOS image sensor is basically column-parallel. However, high frame-rate images with high spatial resolution may require large bandwidth and also large power consumption. This may limit the application of CMOS image sensors for portable devices or wireless sensor networks in which bandwidth and power consumptions are restricted. Reducing the spatial resolution can be one way to reduce the amount of image data in high-speed imaging, but although the distortion for moving objects can be eliminated, the details in the image may be lost.

SUMMARY

In general, an image sensor is disclosed for detecting motion within a region-of-interest (ROI) of an image frame. As an example, a multi-resolution complementary metal-oxide-semiconductor (CMOS) image sensor is described which can provide an adaptive spatial-temporal multi-resolution for the specific region of interest which is autonomously determined from motion detection. The image sensor may simultaneously generate spatial-temporal multi-resolution readouts from multiple channels. For example, the image sensor may utilize two channels: one at low frame rate with a higher spatial resolution for stationary backgrounds delivering the details of scenery; and the other at high frame rate with a reduced spatial resolution for moving objects in the ROI suppressing the motion blur.

The spatial resolution in the ROI can be optimized to reduce the amount of bandwidth and power consumption required for data readout. Combining multiple temporal-spatial resolutions, the sensor can acquire an image with details for stationary objects with negligible motion-blur for the moving objects at low-power consumption and low-bandwidth requirement. For example, since the high-frame readout occurs substantially only in the ROI, the bandwidth as well as the power consumption can be significantly reduced.

As one example, spatial resolution in the ROI may be reduced four times by charge summing in a floating diffusion from four shared pixels in order to enhance signal-to-noise ratio (SNR) during a short integration time. The ROI may be determined in real-time by an integrated motion detection circuit which may be implemented in a small area employing inter-pixel switch operation without requiring any additional in-pixel memory.

For purposes of example, a CMOS image sensor is described herein which simultaneously generates spatial-temporal multi-resolution images from dual channels: one for normal images (e.g., <30 fps) for stationery backgrounds and the other for high frame rate images (e.g., adaptable over 960 fps) with a reduced spatial resolution for moving objects in the ROI. As described herein, the entire image with the details in stationery objects and the suppressed motion-blur in moving objects can be acquired at low power consumption with optimal use of bandwidth. To provide the real-time decision of ROI, this sensor employs on-chip motion detection circuits based on the inter-pixel switch operation by storing the previous frame signal in floating diffusion nodes of the sensor. This may allow a small pixel implementation without adding extra in-pixel memory components. A prototype chip has been implemented using a 0.35 μm 1P4M standard CMOS process and multi-resolution images have been successfully captured without motion blur. The fabricated prototype chip operates at 3.3 V and consumes 75 mW in the multi-resolution readout of a 256×256 normal image at 30 fps and a 64×64 ROI image at 240 fps.

In one embodiment, a sensor includes an array of pixels to capture an image, the array of pixels arranged as a plurality of pixel groups, each of the pixel groups having a two or more pixels coupled to a shared floating diffusion node for outputting merged image signals from the pixel groups, at least one inter-pixel switch to control transfer of electrical charge from a floating diffusion node for a first one of the pixel groups to a floating diffusion node for a second one of the pixel groups to temporarily store a portion of a previous image frame within the floating diffusion node for the second one of the pixel groups, and a motion comparator to compare an image signal from the first one of the pixel groups with an image signal from the second one of the pixel groups to detect motion between a current frame and the previous frame.

In another embodiment, a video capture device comprises a sensor comprising an array of pixels to capture an image, the array of pixels arranged as a plurality of pixel groups, each of the pixel groups having a two or more pixels coupled to a shared floating diffusion node for outputting merged image signals from the pixel groups, at least one inter-pixel switch to control transfer of electrical charge from a floating diffusion node for a first one of the pixel groups to a floating diffusion node for a second one of the pixel groups to temporarily store a portion of a previous image frame within the floating diffusion node for the second one of the pixel groups, and a motion comparator to output motion information signals based on a comparison of the image signal from the first one of the pixel groups with the image signal from the second one of the pixel groups motion between a current frame and the previous frame. The video capture device further includes a region-of-interest (ROI) decision unit to receive the motion information signals from the motion comparator and output ROI address information to the sensor based on the motion information signals.

In another embodiment, a method comprises generating, within an image sensor having an array of pixels, pixelized data from sensed light, wherein the array of pixels are arranged as a plurality of pixel groups, each of the pixel groups having a two or more pixels coupled to a shared floating diffusion node for outputting merged image signals from the pixel groups, temporarily storing a previous frame signal within a shared floating diffusion node of at least one of the pixel groups, wherein the shared floating diffusion node operates as an analog temporary memory to temporarily store the previous frame signal within the image sensor, comparing, within the image sensor, the stored previous frame signal to a current frame signal to identify motion.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7 is a block diagram that illustrates a conceptual diagram of Region-of-Interest (ROI) readout.

FIG. 8A is a block diagram illustrating an example circuit diagram that illustrates example pixel merging operation.

FIG. 8B is a block diagram illustrating example readout associated with pixel merging.

FIGS. 19A-19F are block diagrams illustrating shows the captured images from the fabricated device shown in FIGS. 18A-18B.

DETAILED DESCRIPTION

Figure 1:
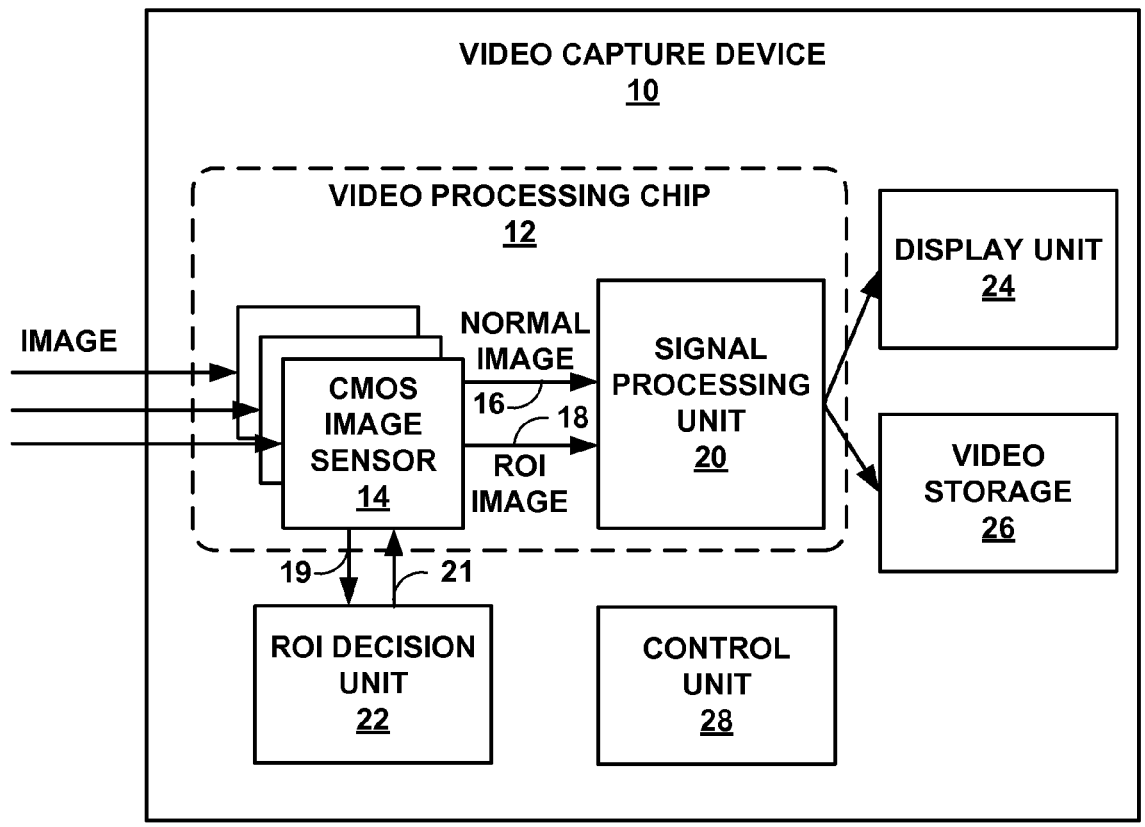
FIG. 1 is a block diagram illustrating an example video capture device for capturing and processing image data in accordance with the principles of the invention.

FIG. 1 is a block diagram illustrating an example video capture device 10 for capturing and processing image data in accordance with the principles of the invention. By way of example, video capture device 10 may comprise a digital video camera, a video-enabled wireless communication device such as a cellular or satellite radio telephone, a video-enabled personal digital assistant (PDA), or any device with imaging or video capabilities.

As shown in FIG. 1, video capture device 10 includes a video processing chip 12 to capture raw image data and perform various processing techniques on such data. Video processing chip 12 includes one or more complementary metal-oxide-semiconductor (CMOS) image sensors 14 that capture pixelized image data. Region-of-interest (ROI) decision unit 22 identifies a region-of-interest ROI within a frame based on motion image signals 19 received from CMOS image sensor(s) 14, and provides address information 21 for the ROI within the frame to CMOS image sensor(s) 14. ROI decision unit 22 may recalculate the location of the ROI on a frame-by-frame basis.

As described in further detail below, CMOS image sensor(s) 14 output image data via a normal image signal 16 and a region-of-interest (ROI) image signal 18 to signal processing unit 20. Normal image signal 16 may include the portions of the image frame other than the identified ROI portion. Normal image signal 16 may have a higher image resolution and a lower frame rate, whereas ROI image signal 18 may have a lower image resolution and a higher frame rate. Signal processing unit 20 combines image data carried by image signals 16, 18, and may output a merged video output to display unit 24 and/or video storage 26. In some embodiments, one or both of signal processing unit 20 and ROI decision unit 22 may be integrated on-chip with CMOS image sensors 14. Further, in some embodiments, CMOS image sensor(s) 14 may identify a plurality of ROIs in each frame, and may output a plurality of ROI image signals for processing by signal processing unit 20.

Display unit 24 may by a liquid crystal display (LCD) or other form of display that presents the merged video output for viewing by a user. Video storage 26 may store the merged video output into a storage medium, such as a Flash memory, PC card, hard-disk or other medium. Control unit 28 provides control signals to initiate and control the capture, display and storage of video data by video capture device 10. Control unit 28 may be responsive to input signals from one or more input devices, e.g., keys, touch-screens, switches, or other devices. By way of example, control unit 28 may be a general-purpose processor, digital signal processor (DSP), field programmable gate array (FPGA), or other suitable hardware logic capable of providing an environment for controlling video capture device 10.

As shown in FIG. 1, video processing chip 12 may comprise a single integrated chip, if desired. Alternatively, video processing chip 12 may comprise a "chip set" in which the components shown in FIG. 1 are implemented in a plurality of integrated circuits and any other necessary interface logic.

Figure 2:
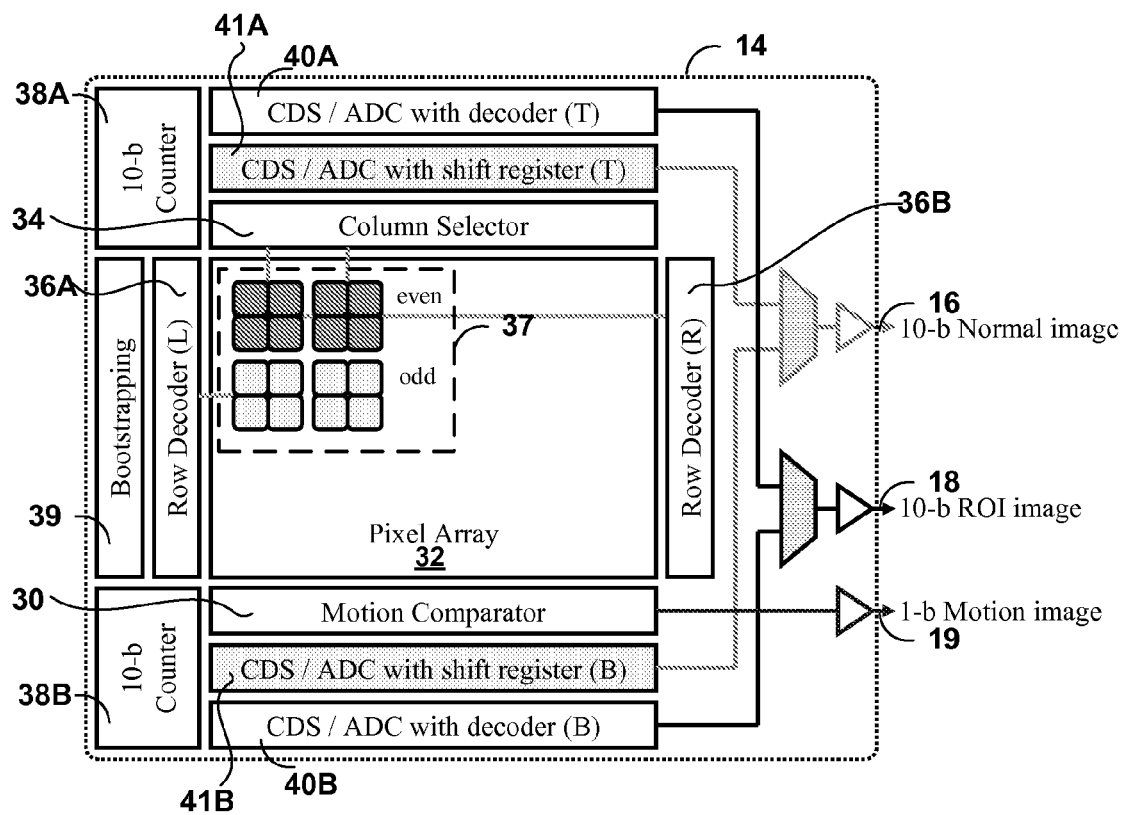
FIG. 2 is a block diagram illustrating an example CMOS image sensor in further detail.

FIG. 2 is a block diagram illustrating an example CMOS image sensor 14 in further detail. CMOS image sensor 14 includes a pixel array 32 having rows and columns of photo-diode-based pixels for capturing light and generating image data in the form of analog voltage. In normal operation, CMOS image sensor 14 may operate as a conventional image sensor to output 256×256 10-bit depth normal images at 30 frames per second. In a motion tracking mode, CMOS image sensor 14 additionally outputs a 128×64 1-bit motion image 19 used to identify a region of interest (ROI) within pixel array 32 and a 10-bit depth ROI image 18 for the identified portion of the pixel array.

More specifically, upon detecting motion, an integrated motion comparator 30 is activated to provide a 128×64 1-bit motion image 19 to ROI decision unit 22 (FIG. 1) based on the inter-frame difference. Using this 1-bit motion information 19, ROI decision unit 22 determines a location of the ROI within pixel array 32 for tracking a moving object. ROI decision unit 22 may be an external Complex Programmable Logic Device (CPLD). Then, 10-bit ROI image 18 is read at a high frame rate suppressing the motion blur. The address information 21 for the ROI (FIG. 1) as determined by ROI decision unit 22 is accessed by a column selector 34 and two row decoders 36A-36B.

The left and right row decoders 36A, 36B select even/odd rows, respectively, and column selector 34 enables independent pixel control for the ROI as well as the background region (outside of the ROI). In the ROI, groups of pixels (e.g., a plurality of 2×2 pixel group such as pixel group 37) within pixel array 32 may be spatially merged by charge summing the shared pixels using a floating diffusion (FD) node associated with the pixel group. This may allow a high signal-to-noise ratio (SNR) even at a high frame rate where integration time is short.

In the example embodiment of FIG. 2, a single-slope analog-to-digital converter (ADC) may be adopted in CMOS image sensor 14, and two counters 38A, 38B may be integrated for single-slope ADCs. A bootstrapping block 39 generates a control voltage over $V_{DD}+V_{TH}$ to compensate for threshold voltage drops in a signal path when CMOS image sensor 14 enables inter-pixel switches (not shown). A motion comparator 30 compares the previous frame signal with the current frame signal and provides a 1-b motion image 19.

Top and bottom Correlated Double Sampling/Analog-to-Digital Converter (CDS/ADC) blocks 40A-40B and 41A-41B sample the signals from even/odd columns, respectively. As described, CMOS image sensor 14 offers dual channels for a multi-resolution readout: one is for normal image signals scanned by a shift register 41 and the other is for ROI image signals selected by a decoder 40. The dual channel CDS/ADC blocks 40A-40B and 41A-41B allow for independent access of the ROI image from a separate channel in a reduced spatial-resolution. For example, spatial resolution may be reduced by a factor of four (2×2 pixels merged) at a high frame rate (e.g., >960 fps). Normal images with a full spatial resolution at low frame rate (e.g., <30 fps) can be simultaneously acquired in a different output channel. The normal image 16 and the ROI image 18 may be combined together by signal processing unit 20 (FIG. 1) to construct a multi-resolution image which contains the entire object without any motion blur. For example, normal image 16 and ROI image 18 may be averaged, or may be combined in a weighted manner. Other combination methods may be used, and the combination scheme may be programmable. According to applications, the required image may be selectively accessed and therefore the data bandwidth can be minimized and the power consumption can be reduced. Furthermore, only the working blocks may activated in each mode operation by an on-chip power-management circuit (not shown).

Figure 3:
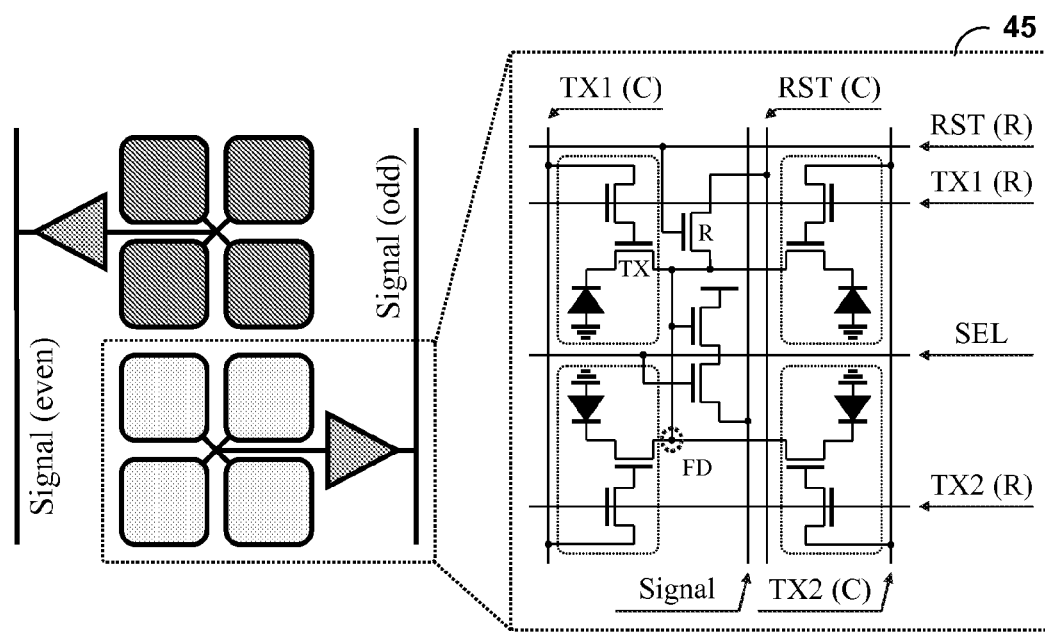
FIG. 3 is a block diagram illustrating an example pixel architecture.

FIG. 3 is a block diagram illustrating an example pixel architecture 45 of a portion of pixel array 32. In the example of FIG. 3, pixel architecture 45 employs a 4-T pixel structure and four neighboring pixels are shared to form a pixel group. In order to provide an adaptive resolution in the ROI, pixels in the specific rows and columns may be independently controlled. For regional control, both a transfer transistor TX and a reset transistor R are activated only when both the row and the column selection signals are enabled. In order to control charge transfer, an additional transistor is connected to the gate of transistor TX. The charge integrated in the photodiode is transferred when both the TX (R) signal from the row decoder and the TX (C) signal from the column selector are enabled. In the same manner, a floating diffusion node FD is reset when both the RST (R) signal and the RST (C) signal are enabled.

Figure 4:
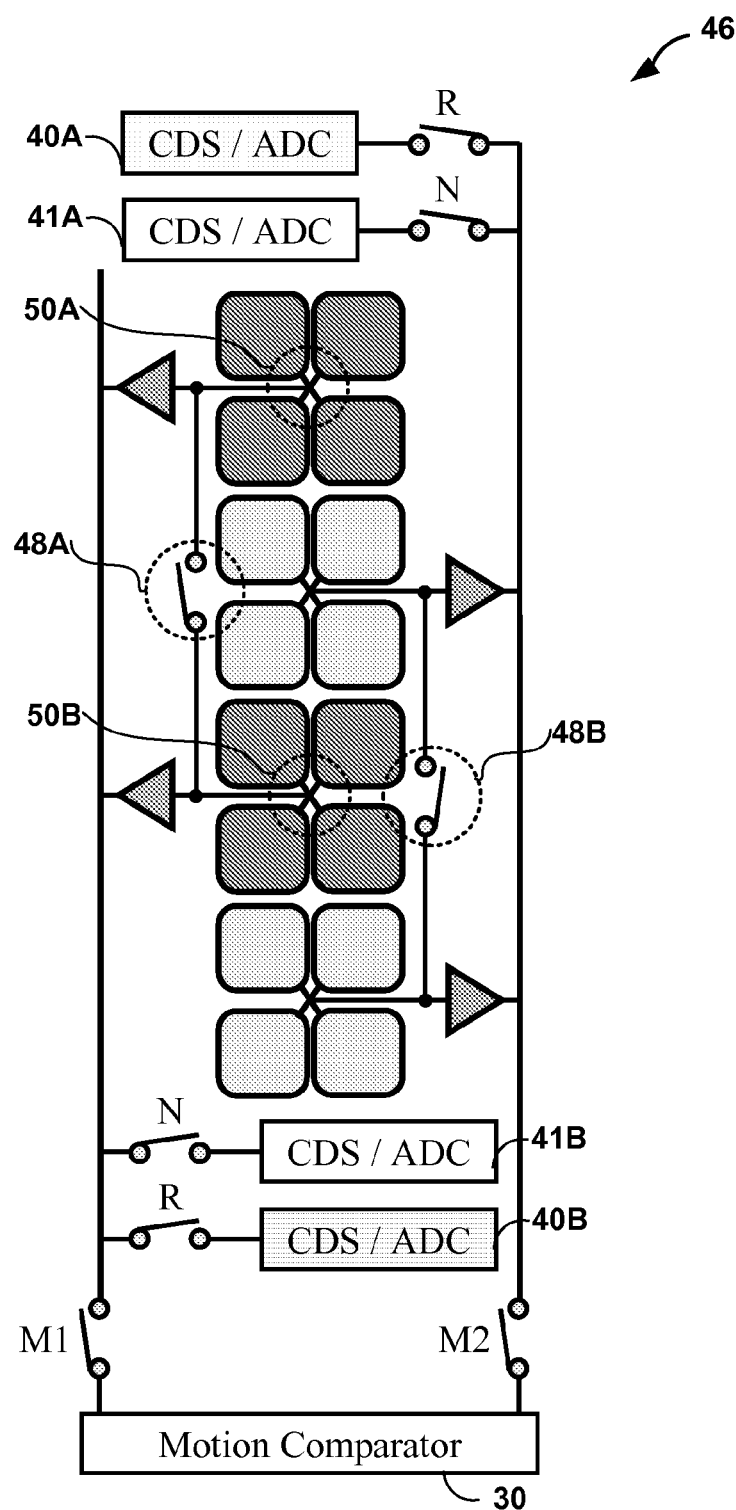
FIG. 4 is a block diagram illustrating an example column architecture.

FIG. 4 is a block diagram illustrating an example column architecture 46 of a portion of pixel array 32. For motion detection, inter-pixel switches 48A, 48B between groups of pixels may be used as a path for storing the previous frame signal by connecting floating diffusion nodes of different pixel groups. For example, an inter-pixel switch 48A may be used as a path for storing the previous frame signal by connecting an upper floating diffusion node 50A of a first pixel group with a lower floating diffusion node 50B of a second pixel group. In this way, image data for a current image is temporarily stored for one pixel group by using the floating diffusion node for a different pixel group. In this way, no additional in-pixel memory is required for motion detection. The signal from the pixels can be selectively sampled in one of the two CDS/ADC blocks or in the motion comparator 30 by the switch operations: N for normal image, R for ROI image capturing, and M1, M2 for motion detection.

Motion detection may be accomplished by comparing the inter-frame difference of the image data (electrical charge) stored within pixel array 32. Motion comparator 30 may compare a current frame signal with a previous frame signal, and based on the difference between the two, motion comparator 30 may generate 1-bit motion signals when the difference is higher than a certain threshold level. In this manner, the 1-bit motion signals can be viewed as a bit map representing the presence or absence of motion. Generally speaking, in order to obtain the difference between the current frame signal and the previous frame signal, the previous frame signal has to be stored in a storage element. Conventional approaches using additional storage elements such as frame memory or in-pixel capacitors may not be adequate for efficient implementation. For example, the area of frame memory would be comparable to that of pixel arrays or even larger. As another example, if an in-pixel capacitor is integrated in the pixel, fill-factor of the pixel (i.e., the portion of the photo-sensitive area allocated to the pixel) may be significantly reduced. Use of inter-pixel switches to temporarily store charge from one pixel group to the floating diffusion node of another pixel group, as described herein, allows a high fill-factor and a small pixel size to be maintained. As described herein, a floating diffusion node FD is used as an analog memory for storing the previous frame signal during the integration time.

Figure 5:
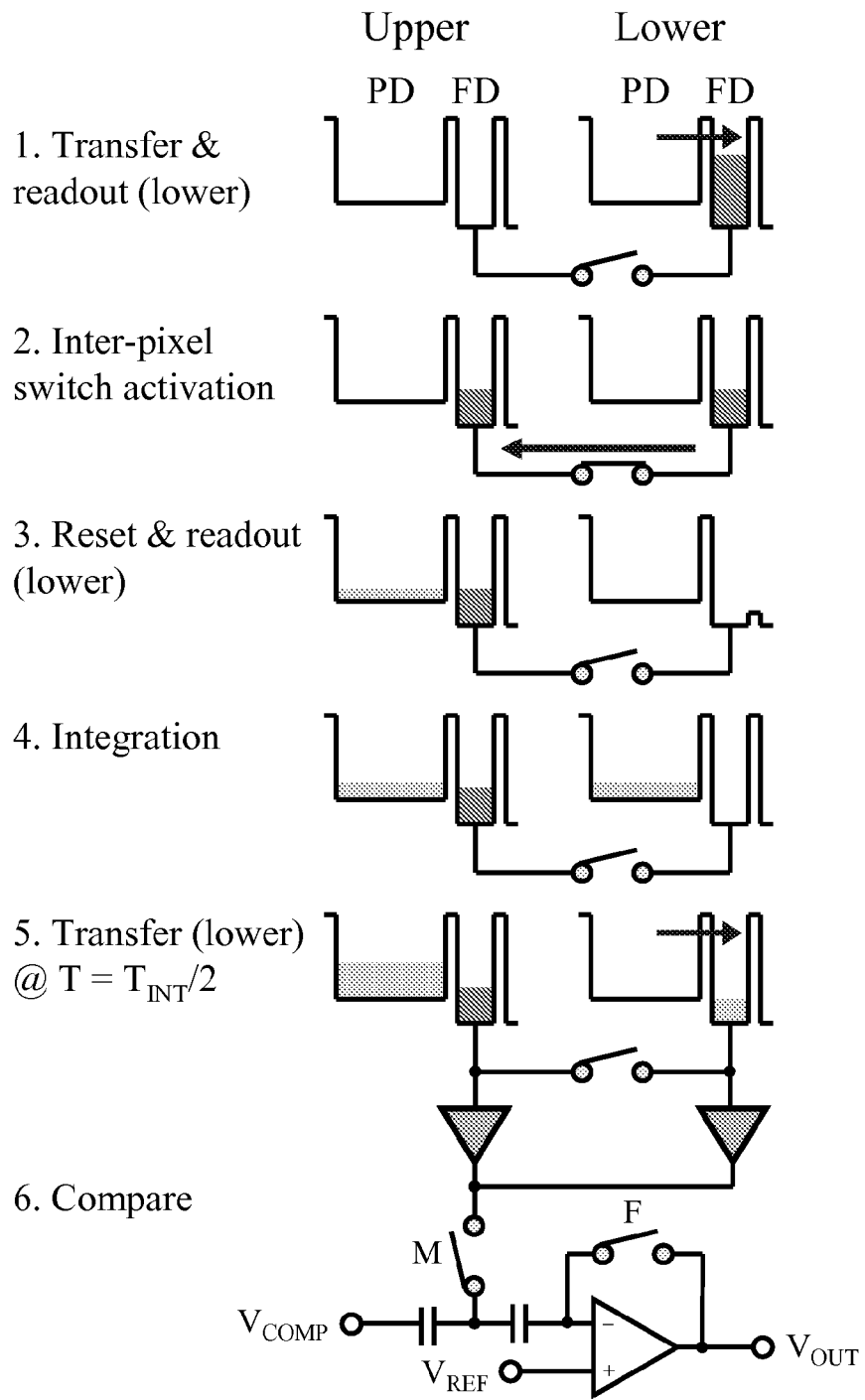
FIG. 5 is a series of electron-potential diagrams that illustrate the operation procedures of motion detection.

FIG. 5 is a series of electron-potential diagrams that illustrate the operation procedures of motion detection. The inter-pixel switch is shown in each diagram for the connection between upper and lower pixel groups. Initially, the electrical charge representing the image data from lower pixel group signal is sampled and read out (Step 1). A single pixel of the pixel group may be addressed, or multiple pixels of the pixel group may be address so as to output a combined electrical charge via the FD. In either case, the inter-pixel switch (IS) is then activated and the half of the electrical charge in the lower FD is transferred to the upper FD since the capacitances of two FDs are same (Step 2). After IS is turned off, the upper FD stores the half of the signal of the lower pixel group during the half of the integration time ($T_{INT}/2$) (Step 3). Next, integration occurs and electrical charge is collected within the pixels for the current frame image (Step 4). After $T_{INT}/2$, the previous frame signal stored in the upper FD for each of a set of pixel groups (e.g., an upper row) and a newly generated signal for the current frame is successively sampled from the lower FD of each of a second set of pixel groups (e.g., a lower row) (Step 5) and compared by motion comparator 22 (Step 6). After another $T_{INT}/2$, the newly generated charge during the second $T_{INT}/2$ will be added to the remaining charge in the lower FD and the combined signal will be read out, and this procedure will repeat.

Figure 6:
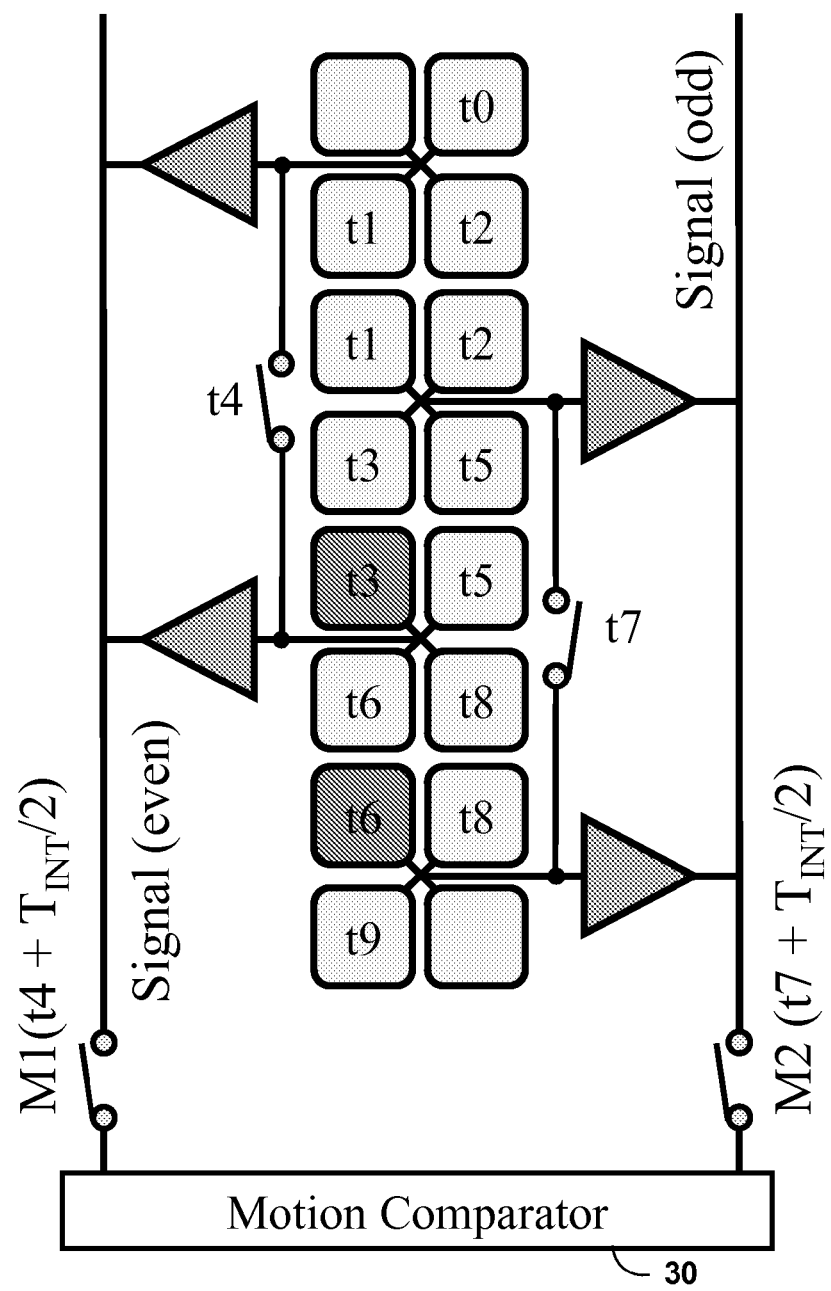
FIG. 6 is a block diagram illustrating the conceptual timing of the motion detection procedure.

FIG. 6 is a block diagram illustrating the conceptual timing of the motion detection procedure. The number (t1-t9) marked in the pixels shows the relative sequence of operational timing. At t3, two pixels are read simultaneously through separate even/odd signal lines. At t4, the inter pixel switch is turned on and the half of the charge of the upper-left pixel (shown as shaded dark) is transferred to the upper floating diffusion node. After an integration period of $T_{INT}/2$ during which time electrical charge is collected, the switch M1 is activated at $t4+T_{INT}/2$ and the stored previous frame signal and the current frame signal are successively sampled and compared by motion comparator 30. After two more row access times (t5 & t6), the inter-pixel switch is closed at t7 after reading the pixel at t6. Switch M2 is activated at $t^7+T_{INT}/2$ and the other sets of the previous and current signals are sampled and compared by motion comparator 30.

FIG. 7 is a block diagram that illustrates a conceptual diagram of ROI readout. Using the 1-b motion image signal 19 from the motion comparator 30, ROI decision unit 22 calculates the ROI address information 21 and sends it to CMOS image sensor 14. For example, ROI decision unit 22 may receive a 1-b motion image signals 19 from each floating diffusion node within the pixel array. The motion image signals together may act as a map detected motion within the pixel array. Based on the motion image signals 19 received, ROI decision unit 22 can identify a center of a region in which the motion image signals indicate that motion is present. As a result, ROI decision unit 22 may control a 9-b row address 21A to the row decoders 36 and a 1-b serial column selection pattern 21B to the column selector 34 to sequentially select the pixels within a defined region surrounding the identified center of the ROI. Row decoders 36 and column selector 34 may then access the ROI pixels. After ADC operation, only the ROI image signals are selected by a column decoder and CMOS image sensor 14 produces a 10-b ROI image. Once the ROI is assigned, motion comparator may continuously perform motion detection inside the ROI to track a moving object, and ROI decision unit 22 may consecutively define a new ROI within pixel array 32 according to the movement of the object.

FIG. 8A is a block diagram illustrating an example circuit diagram that illustrates example pixel merging operation. In the ROI, resolution can be reduced by charge summing in a floating diffusion node. For purposes of example, charge summing of all four pixels of a 2×2 pixel group will be discussed. By activating the four transfer transistors in the shared pixels, the charges integrated in the four pixels are simultaneously transferred and added in the common FD as shown in FIG. 8A. In this example, the charge summing may reduce the spatial resolution by ¼, and consequently may provide an enhanced signal-to-noise ratio by double even in a short integration time. The pixel merging in charge domain may have an advantage of better signal-to-noise ratio compared with other pixel merging approaches in analog voltage or in digital domain since the merged signal may not contain either circuit noise or the quantization noise.

FIG. 8B is a block diagram illustrating example readout associated with pixel merging. Two merged signals are read simultaneously through the two signal lines during one row access time, as shown in FIG. 8B. This may consequently increase the frame rate four times faster than the normal readout.

Figure 9:
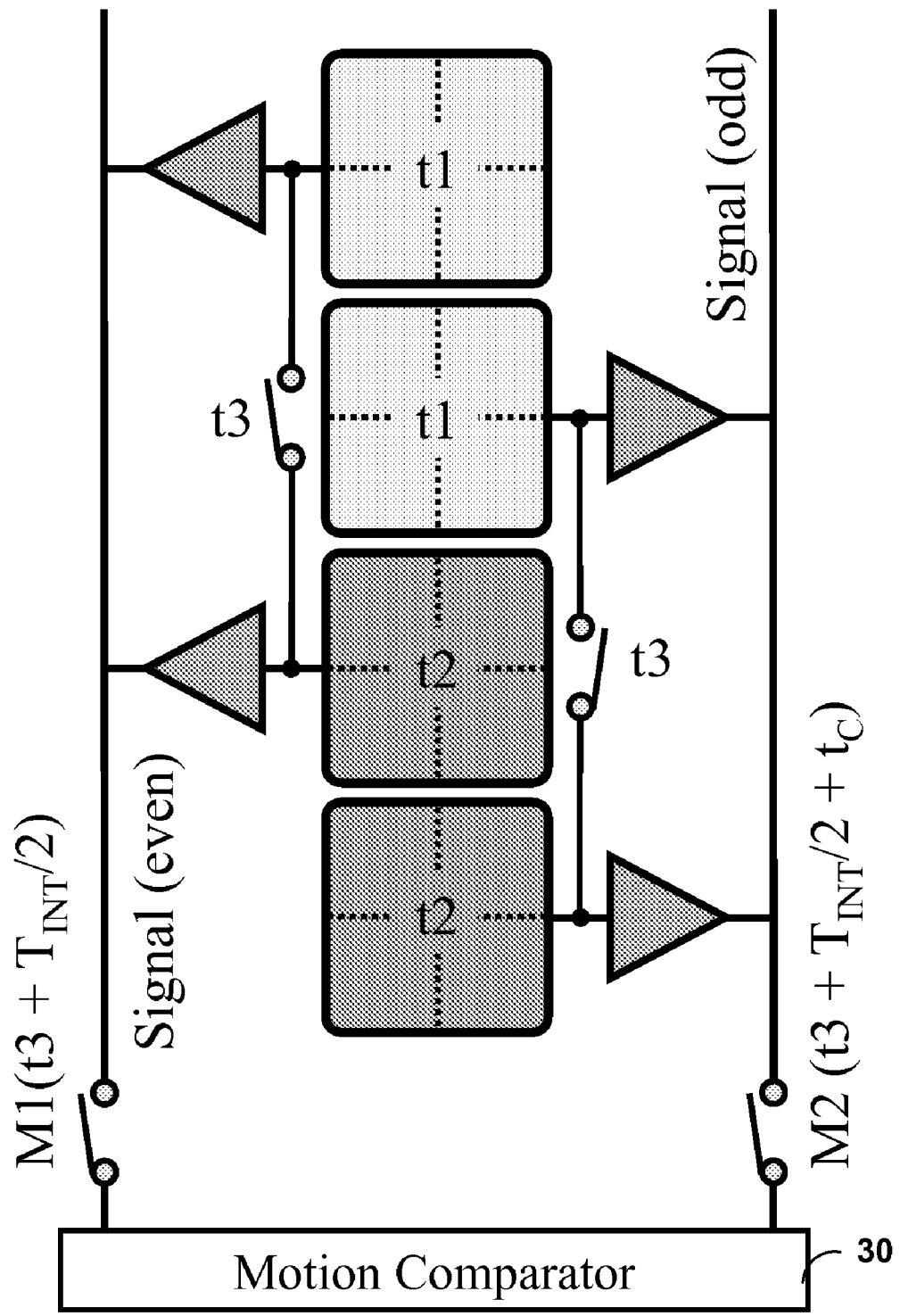
FIG. 9 is a block diagram illustrating timing of motion detection in pixel merging.

FIG. 9 is a block diagram illustrating motion detection in pixel merging. After the ROI is determined, motion comparator 30 performs motion detection using the merged pixel signals as shown in FIG. 9. At t1, the two upper merged sets of pixels (i.e., pixel groups) are read. At t2, the lower two sets of merged pixels (i.e., pixel groups) are simultaneously read. At t3, CMOS image sensor 14 turns on inter pixel switches and the half of the charges of the two merged pixels (the pixel groups shaded dark in the figure) are simultaneously transferred to the upper floating diffusion nodes, respectively. After $T_{INT}/2$, CMOS image sensor 14 activates the switch M1 and motion comparator 30 samples and compares the previous and current frame signals of the merged pixels. After reading 1-b motion image through the shift register, CMOS image sensor 14 activates the switch M2, and motion comparator 30 samples and compares the other sides of signals.

Figure 10:
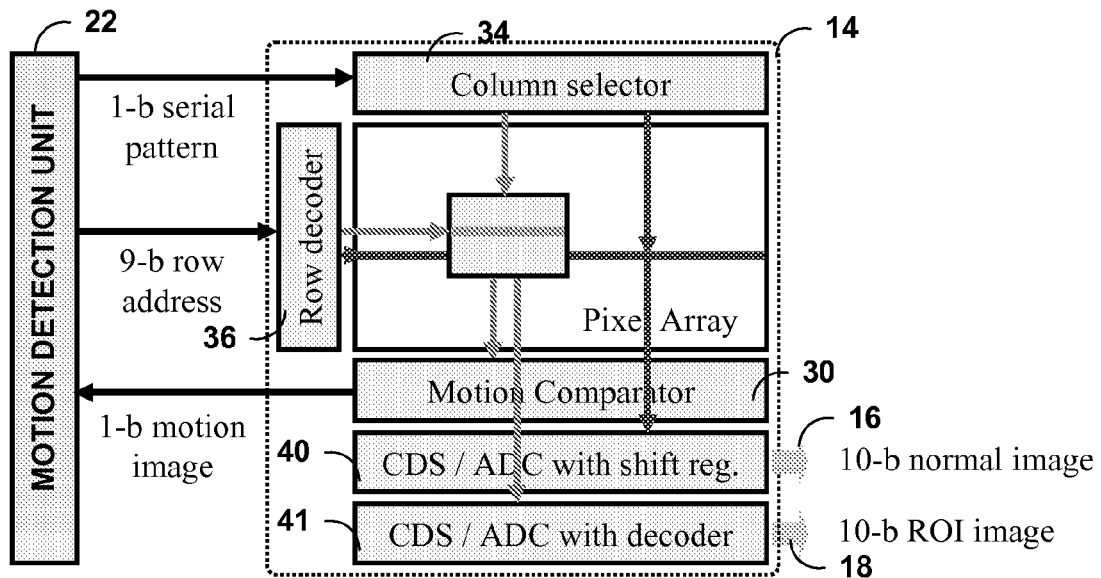
FIG. 10 is a block diagram illustrating a conceptual diagram of a multi-resolution readout.

FIG. 10 is a block diagram illustrating a conceptual diagram of a multi-resolution readout. In the multi-resolution readout, the two row decoders 36 and a column selector 34 provide the independent pixel control for the ROI as well as the background region, i.e., the remaining region other than the ROI. Two CDS/ADC blocks 40, 41 provide the normal image signal 16 and ROI image signal 18, respectively, in dual channels.

Figure 11:
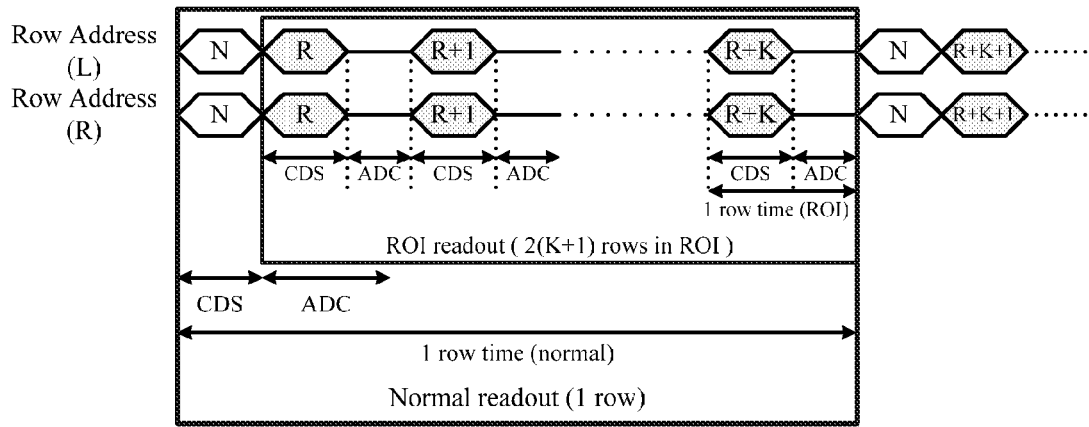
FIG. 11 is a timing diagram illustrating multi-resolution readout.

FIG. 11 is a timing diagram illustrating multi-resolution readout. The ROI signals are accessed at high frame rate during the blanking time of one row time for normal readout. During the blanking time, 2(K+1) rows can be read in the ROI since the two rows can be read simultaneously by pixel merging, as depicted in FIG. 8B. The value of K depends on the row time of the normal readout. If normal readout in the background region has a slower frame rate, then K increases and the frame rate of the ROI readout also increases. For example, in the case of 15 fps normal image readout, K becomes 7 and the ROI image can be read at 960 fps (in a 64×64 array of ROI).

Figure 12:
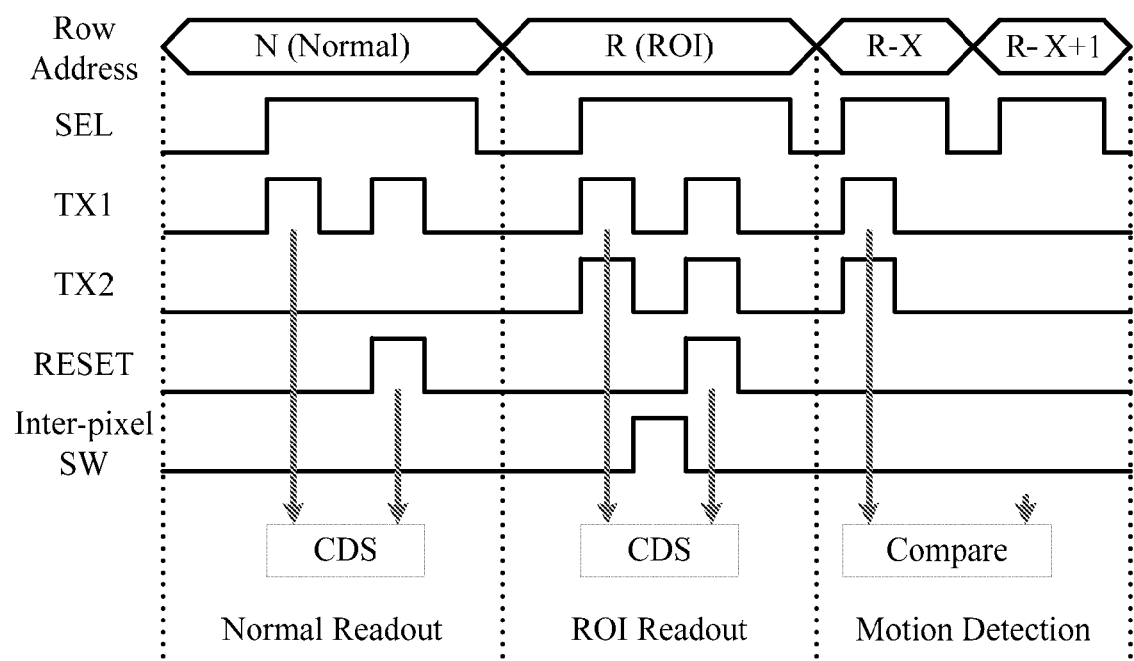
FIG. 12 is a timing diagram illustrating Correlated Double Sampling (CDS) and motion detection.

FIG. 12 is a timing diagram illustrating Correlated Double Sampling (CDS) and motion detection. First, normal image signals and the reset values may be successively sampled for the CDS. In one embodiment, a p-n diode from the standard CMOS process may be used instead of a customized pinned photodiode, in which case the process may not be considered a true CDS. After a normal readout, the ROI image signals are sampled and the inter-pixel switch is turned on for motion detection in the next frame. For CDS, reset values are sampled again after the inter-pixel switch is deactivated. Motion detection starts after the CDS for the ROI signals has been completed. Row address will change to (R-X) where X is half the total number of rows in the ROI since the motion detection starts at every $T_{INT}/2$.

Figure 13:
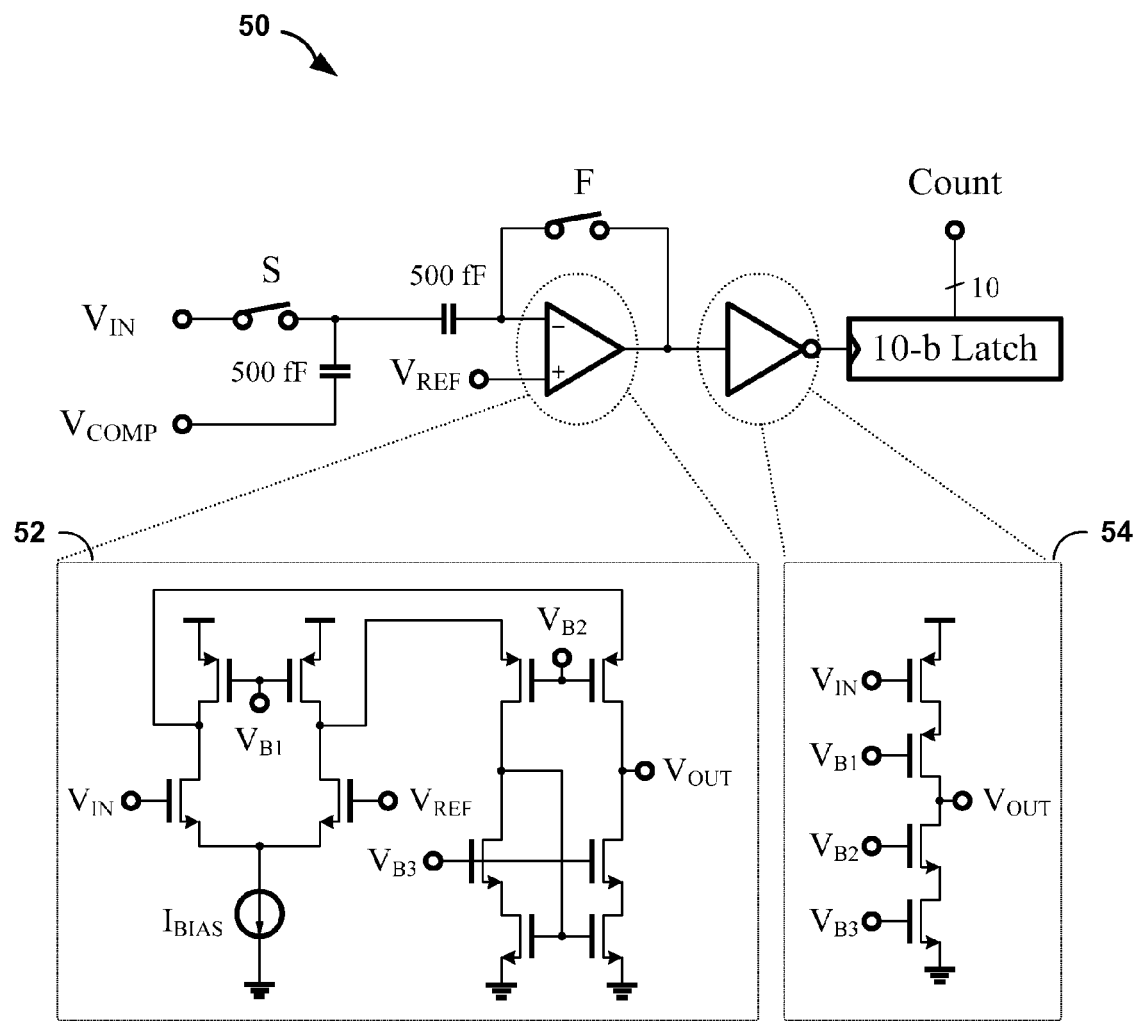
FIG. 13 is a circuit diagram illustrating an example CDS/ADC circuit block that may be used for both the normal and the ROI images.

FIG. 13 is a circuit diagram illustrating an example CDS/ADC circuit block 50 that may be used for both the normal and the ROI images. The CDS/ADC circuit block performs correlated double sampling and analog-to-digital conversion successively. The first stage amplifier 52 adopts a folded-cascode amplifier scheme for large bandwidth. In the second stage amplifier 54, another cascode amplifier is added to enhance the voltage gain. Both the sampling and the coupling capacitors may use 500 fF. For the single-slope ADC, the ramp signal ($V_{COMP}$) is provided from an off-chip digital-to-analog (DAC). A motion comparator may have a similar structure as the CDS/ADC circuit, with the difference being that the output of the second stage amplifier is connected with 1-b latches instead of the 10-b latch in order to provide a 1-b motion image.

Figure 14A:
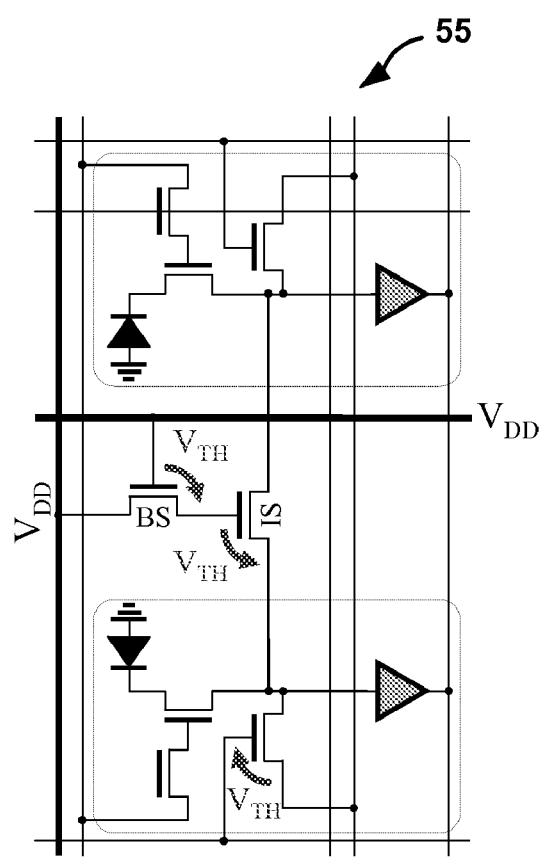
FIG. 14A is a circuit diagram illustrating example voltage drops in an inter-pixel switch.

FIG. 14A is a circuit diagram illustrating example voltage drops in an inter-pixel switch. In order to control the inter-pixel switch (IS) by row decoders and a column selector, circuit 55 includes an additional bootstrapping transistor BS, as shown in FIG. 14A. Adding transistor BS results in a $2V_{TH}$ drop across the transistors: $1V_{TH}$ drop across the IS transistor and $1V_{TH}$ drop across the BS transistor.

Figure 14B:
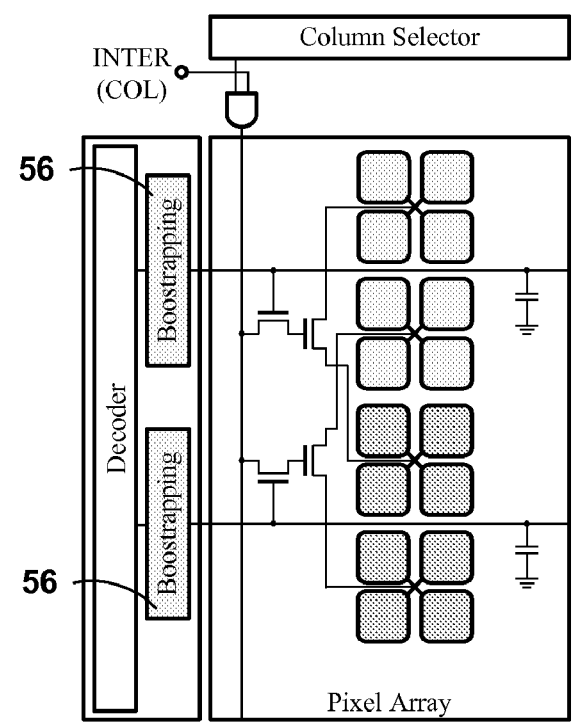
FIG. 14B is a block diagram illustrating example bootstrapping blocks.

FIG. 14B is a block diagram illustrating example bootstrapping blocks 56. Since the maximum voltage of FD is the reset voltage of ($V_{DD}$–$V_{TH}$), the two FDs cannot be completely equalized by IS due to a $2V_{TH}$ drop. In order to resolve this problem, a bootstrapping block 56 may be integrated to generate a voltage over $V_{DD}$+$V_{TH}$ for an enabling signal of IS as shown in FIG. 14B. One bootstrapping block 56 may be integrated in every four rows, and each one of the bootstrapping blocks 56 may be selected by the row decoder.

Figure 15A:
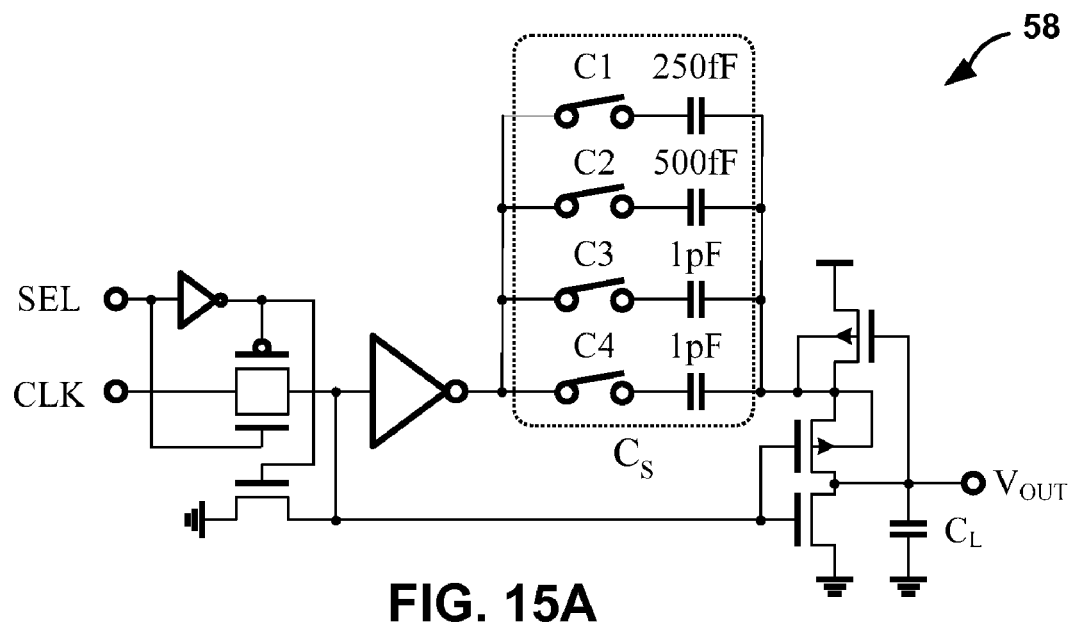
FIG. 15A is a schematic diagram illustrating an example bootstrapping circuit.

FIG. 15A is a schematic diagram illustrating an example bootstrapping circuit 58. Output voltage of bootstrapping circuit 58 can be given by $$V_{OUT} = 2\left(\frac{C_S}{C_S + C_L}\right)V_{DD}$$

where $C_S$ is sampling capacitance and $C_L$ is load capacitance. Since one bootstrapping circuit drives a row bus which has the large parasitic capacitance, bootstrapping circuit 58 implements a scheme to provide variable $C_S$ which allows a customized output voltage for reliable IS operation. In the example of FIG. 15A, four capacitors are integrated in one bootstrapping circuit 56 and the range of $C_S$ varies from 250 fF to 2.75 pF. A total of eleven distinct output voltages can be generated by the selection switches. Other numbers of capacitors or capacitor values may alternatively be used.

Figure 15B:
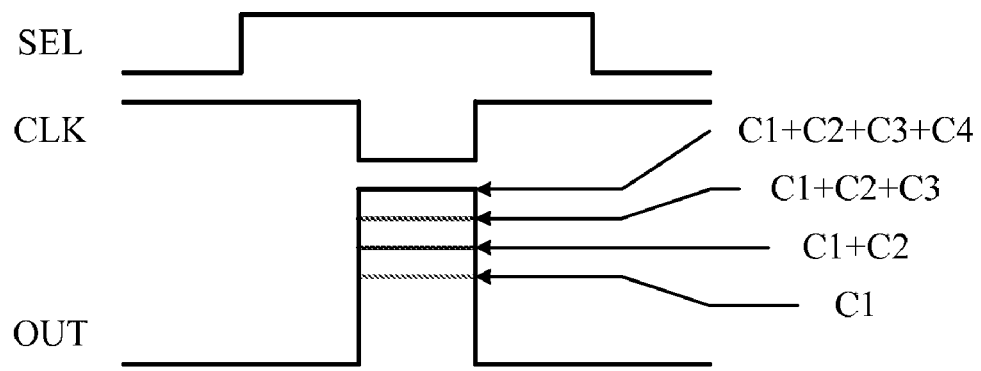
FIG. 15B is a timing diagram illustrating example the operation timing of bootstrapping circuit.

FIG. 15B is a timing diagram illustrating example the operation timing of bootstrapping circuit 58. A clock signal is only applied to the selected bootstrapping circuit. When a selection signal is enabled from the decoder and the clock is asserted, a bootstrapped output voltage is provided according to the selected switch configuration.

Figure 16A:
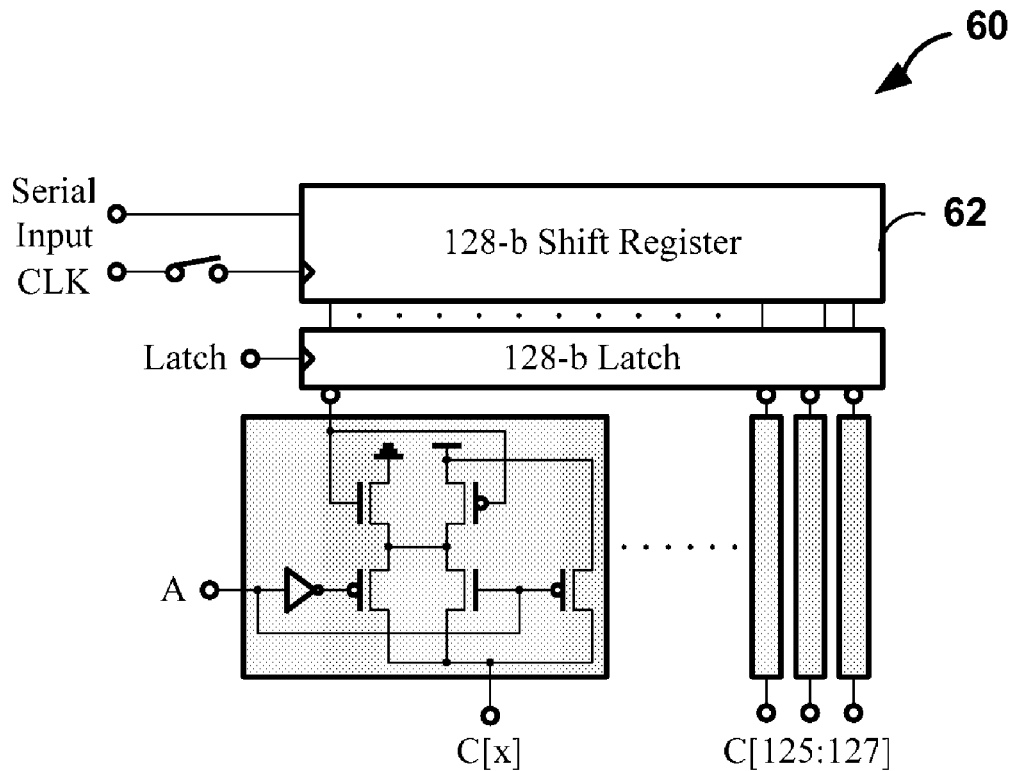
FIG. 16A is a block diagram illustrating an example column selector.

FIG. 16A is a block diagram illustrating an example column selector 60. Column selector 60 provides signals for IS selection and pixel control. In the column selector 60, a serial input is loaded to a 128-b shift register 62 and then latched. After latch, the next serial pattern can be loaded. Signal A in the column selector determines whether to activate all the columns or only the selected columns.

Figure 16B:
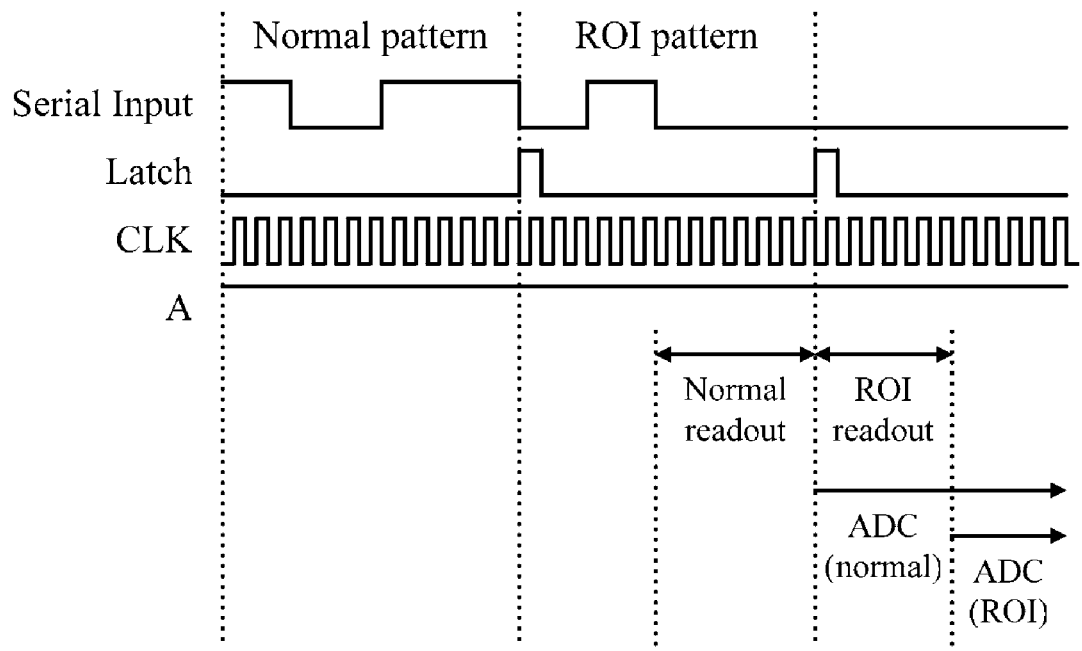
FIG. 16B is a timing diagram illustrating example operation of column selector.

FIG. 16B is a timing diagram illustrating example operation of column selector 60. First, the serial input digits of column information for normal images are loaded and latched to a 128-b shift register. Next, the ROI column information is loaded. While the ROI column information is loaded, the normal image reading is completed using the stored patterns in the 128-bit latch. After that, the ROI image capturing is initiated. During this time, the normal image is converted into digital signals by the ADC operation. This pipelining operation may allow the high frame rate capture of the ROI by effectively allocating the timing slots for multiple temporal resolutions.

Figure 17:
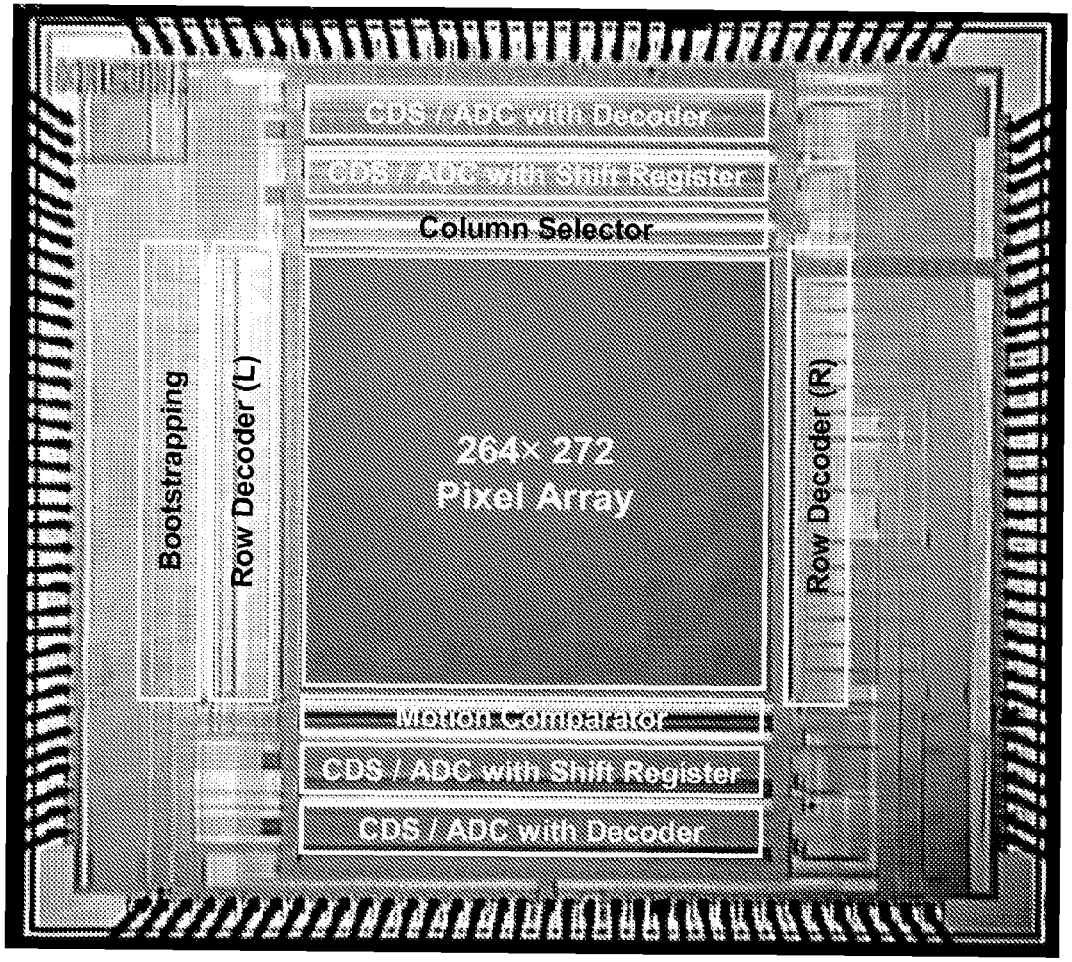
FIG. 17 is a microphotograph illustrating an example prototype chip.

FIG. 17 is a microphotograph illustrating an example prototype chip 68. The prototype chip 68 was fabricated using a 0.35 μm 1P4M CMOS logic process and has been fully characterized. Prototype chip 68 has 264×272 pixel array including dummy pixels. The size of prototype chip 68 is 5×5 mm² and the size of pixel array is 2.4×2.4 mm².

Figure 18A:
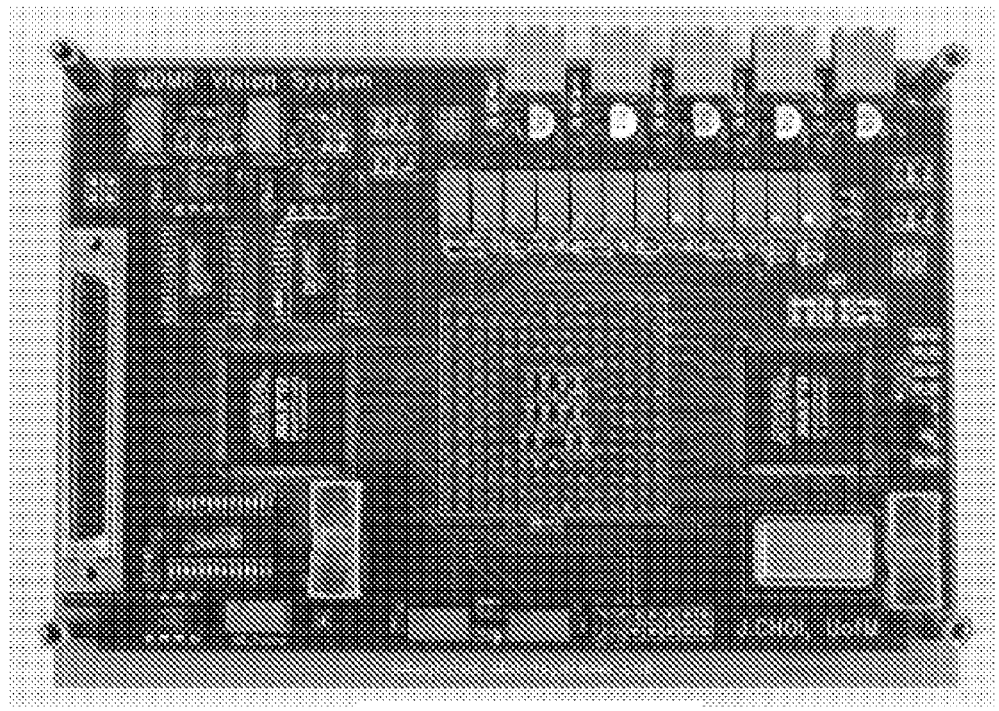
FIGS. 18A-18B are photographs illustrating a top view and a bottom view, respectively, of an example fabricated device on a test board including the fabricated sensor.
Figure 18B:
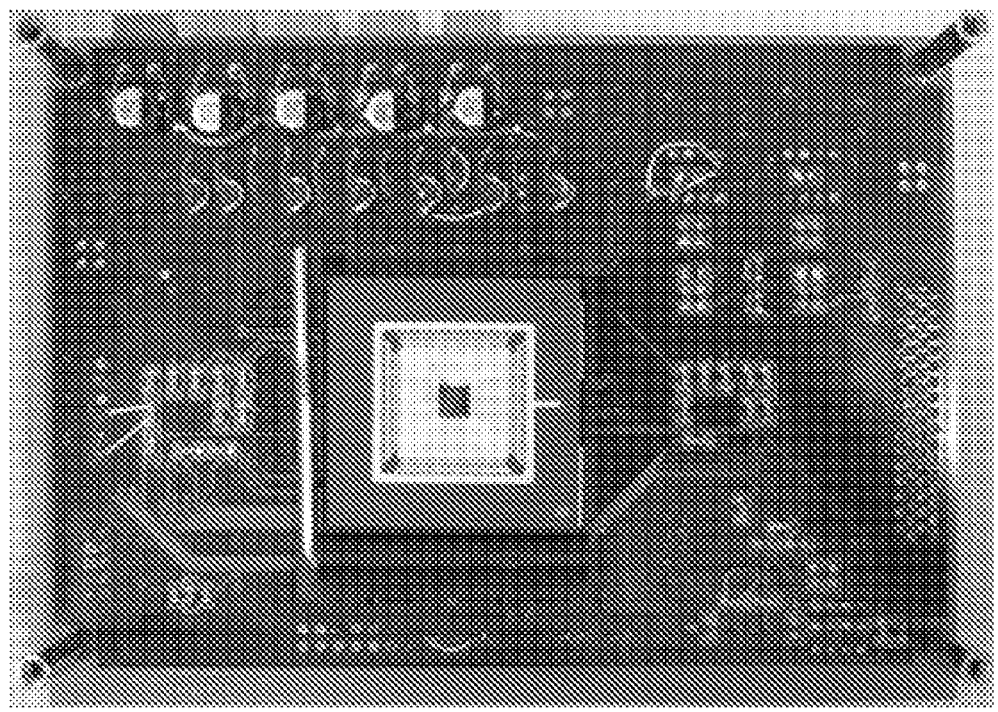

FIGS. 18A-18B are photographs illustrating a top view and a bottom view, respectively, of an example fabricated device on a test board including the fabricated sensor. The fabricated sensor was packaged in the 180-pin PGA by wire bonding and mounted on the test board. The test board contained CPLDs, DACs, bias circuits, and a 50 MHz oscillator. Two CPLDs were mounted for the control of the sensor. One CPLD determined the ROI using 1-b motion image from the sensor and generated pixel control signals, addresses and the column selection pattern. A centroid of the moving object was calculated using the 1-b motion data. Another CPLD buffered output image signals from the sensor and generated the interface signals for the data acquisition card. Image signals were transferred into a 32-b data acquisition card and an output image was displayed by the program.

In some embodiments, specific logic blocks including the noise filtering and some advanced algorithm may be employed for more reliable and faster calculation of the ROI. In some embodiments, an optimal ROI decision logic may be integrated in the sensor.

FIGS. 19A-19F are portions of images reproduced from image data output by the fabricated device shown in FIG. 17. The least significant two bits from the 10-b image output signals were discarded in the experimental program and all images were displayed in 8-b resolution. FIG. 19A shows a 256×256 normal image with full-spatial resolution at 15 fps. In FIG. 19B, a 128×128 image of the stationary wheel is shown with 2×2 pixel merging. FIG. 19C shows two 128×64 1-bit motion images for a rotating wheel. For display purposes, this 1-b motion image from the sensor was mapped into 8-b; i.e., the value of 128 was assigned for '1' and that of 0 for '0'.

FIG. 19D shows a normal image at 15 fps with a rotating panel with a character 'M,' where serious motion blur can be observed. This motion blur is reduced by a high frame rate image. FIG. 19E shows two ROI images at 120 fps and 240 fps, respectively. The motion blur in ROI is completely eliminated in a 240 fps ROI image. In this image capture, the size of the ROI has been set to 64×64, but the size of the ROI is controllable. As shown in FIG. 19F, a 256×256 multi-resolution image has been successfully constructed from the dual channel outputs, where the ROI image is expanded from 64×64 to 128×128 with the brightness being adjusted.

Table 1 below gives the chip characteristics of the exemplary chip of the fabricated device of FIG. 17. The pixel size was 8.9×8.9 μm² and the fill factor was 27% using a standard 0.35 μm CMOS technology. The number of transistors per pixel was three, including the inter-pixel switch. The sensor provided the normal images at a frame rate below 30 fps and the ROI images at a frame rate over 960 fps (in a 64×64 array of ROI when the normal image is captured at 15 fps). The size of ROI was controllable by an external control signal. Total power consumption was 74.87 mW in the multi-resolution readout of 30 fps normal image/240 fps ROI image (64×64) at 3.3V supply voltage.

TABLE 1

| | |
|---|---|
| Technology | 0.35 μm 1P4M CMOS logic |
| Die size | 5 × 5 mm² |
| Array size | 256 × 256 |
| Photodiode | n+/p-sub |
| Pixel size | 8.9 × 8.9 μm² |
| Number of transistors per pixel | 3T |

TABLE 1-continued

| | |
|---|---|
| Fill factor | 27% |
| Dark signal | 24.7 mV/sec |
| Frame rate | <30 fps for the ROI image (at 15 fps normal, 64 × 64 ROI, size is controllable) |
| Supply voltage | 3.3 V |
| Power consumption | 74.87 m W in multi-resolution readout (at 30 fps normal/240 fps 64 × 64 ROI |

A spatial-temporal multi-resolution CMOS image sensor with an integrated motion detector and dual channel readout has been described. The test chip has been fabricated using a standard 0.35 μm 1P 4M CMOS process, and fully characterized. The proposed CMOS image sensor simultaneously generates spatial-temporal multiple-resolution readouts from the dual channels: one for low frame rate image data (e.g., <30 fps) at maximum spatial resolution for stationary backgrounds and the other for high frame rate data (e.g., adaptable over 960 fps) at lower spatial resolution (e.g., four times reduction) for moving objects in a specified ROI. These two images are combined to a multiple-resolution image that limits or eliminates motion blur. An on-chip motion detection scheme using an inter-pixel switch enables the real-time decision of the ROI containing the moving object in a small pixel area. In the ROI, high signal-to-noise ratio can be maintained at the high frame-rate by charge summing in the neighboring pixels (e.g., 2×2 pixel merging). The proposed spatial-temporal multi-resolution readout scheme may be easily extended to large-pixel array image sensors, and may be used to optimize bandwidth and power consumption depending on requirements of frame rates and ROI size. The implemented image sensor may be suitable for bandwidth-limited or power-limited applications such as robot and machine visions, portable vision equipments, wireless sensor networks, or other applications.

Various embodiments of the invention have been described. These and other embodiments are within the scope of the following claims.

The invention claimed is:

1. An image sensor comprising:
an array of pixels to capture an image, the array of pixels arranged as a plurality of pixel groups, each of the pixel groups having a two or more pixels coupled to a shared floating diffusion node for outputting merged image signals from the pixel groups;
at least one inter-pixel switch to control transfer of electrical charge from a floating diffusion node for a first one of the pixel groups to a floating diffusion node for a second one of the pixel groups to temporarily store a portion of a previous image frame within the floating diffusion node for the second one of the pixel groups;
a motion comparator to compare an image signal from the first one of the pixel groups with an image signal from the second one of the pixel groups to detect motion between a current frame and the previous frame;
wherein the floating diffusion node for each pixel group merges the plurality of pixels of the pixel group by electrically connecting the pixels to sum charges of each of the pixels.

2. The sensor of claim 1, further comprising:
a first data channel that outputs image data for a background region of the array of pixels; and
a second data channel that outputs image data for a region-of-interest (ROI) of the array of pixels,
wherein the sensor simultaneously generates image readouts from the first channel and the second channel,
wherein the first channel outputs the image data at a first image resolution and a first frame rate, and
wherein the second channel outputs the image data at a second image resolution lower than the first image resolution and at a second frame rate faster than the first frame rate.

3. The sensor of claim 2, further comprising:
a column selector that enables independent pixel control for the ROI of the pixel array and the background region of the pixel array;
a first row decoder that selects an even row within the pixel array;
a second row decoder that selects an odd row within the pixel array;
a top correlated double sampling/analog-to-digital converter (CDS/ADC) block that samples signals from even columns within the pixel array; and
a bottom CDS/ADC block that samples signals from odd columns within the pixel array.

4. The sensor of claim 1, wherein the motion comparator generates a motion information signal that indicates detected motion based on the comparison when a difference between the previous frame and the current frame is above a threshold level.

5. The sensor of claim 1, further comprising a bootstrapping block that generates a control voltage to compensate a threshold voltage drop in a signal path when the sensor enables the inter-pixel switch.

6. The sensor of claim 1, wherein the sensor is a complementary metal-oxide-semiconductor (CMOS) sensor.

7. A video capture device comprising:
a sensor comprising:
an array of pixels to capture an image, the array of pixels arranged as a plurality of pixel groups, each of the pixel groups having a two or more pixels coupled to a shared floating diffusion node for outputting merged image signals from the pixel groups,
at least one inter-pixel switch to control transfer of electrical charge from a floating diffusion node for a first one of the pixel groups to a floating diffusion node for a second one of the pixel groups to temporarily store a portion of a previous image frame within the floating diffusion node for the second one of the pixel groups, and
a motion comparator to output motion information signals based on a comparison of the image signal from the first one of the pixel groups with the image signal from the second one of the pixel groups motion between a current frame and the previous frame; and
a region-of-interest (ROI) decision unit to receive the motion information signals from the motion comparator and output ROI address information to the sensor based on the motion information signals;
wherein the floating diffusion node for each pixel group merges the plurality of pixels of the pixel group by electrically connecting the pixels to sum charges of each of the pixels.

8. The video capture device of claim 7, further comprising:
a first data channel that outputs image data for a background region of the array of pixels;
a second data channel that outputs image data for a region-of-interest (ROI) of the array of pixels,
wherein the sensor simultaneously generates image readouts from the first channel and the second channel,
wherein the first channel outputs the image data at a first image resolution and a first frame rate, and wherein the second channel outputs the image data at a second image resolution lower than the first image resolution and at a second frame rate faster than the first frame rate; and a signal processing unit that combines the image data from the first data channel with the image data from the second data channel.

9. The video capture device of claim 7, further comprising a plurality of sensors.

10. The video capture device of claim 7, further comprising a display unit to display a merged video output received from the signal processing unit.

11. The video capture device of claim 7, further comprising a video storage unit to store a merged video output received from the signal processing unit.

12. A method comprising:

generating, within an image sensor having an array of pixels, pixelized data from sensed light, wherein the array of pixels are arranged as a plurality of pixel groups, each of the pixel groups having a two or more pixels coupled to a shared floating diffusion node for outputting merged image signals from the pixel groups;

temporarily storing a previous flame signal within a shared floating diffusion node of at least one of the pixel groups, wherein the shared floating diffusion node operates as an analog temporary memory to temporarily store the previous flame signal within the image sensor;

comparing, within the image sensor, the stored previous flame signal to a current flame signal to identify motion; and merging the plurality of pixels within each of the pixel groups by electrically connecting the pixels with the shared floating diffusion node of the pixel group to sum charges of each of the pixels.

13. The method of claim 12, further comprising:

identifying a region-of-interest (ROI) of the array of pixels based on the comparison;

simultaneously outputting image data at a first image resolution and a first frame rate from a first data channel for a background region of the array of pixels and outputting image data at a second image resolution lower than the first image resolution and at a second frame rate faster than the first frame rate from a second data channel for the ROI.

14. The method of claim 13, further comprising combining the image data from the first data channel with the image data from the second data channel.

15. The method of claim 12, further comprising generating a motion information signal that indicates detected motion based on the comparison when a difference between the previous frame signal and the current frame signal is above a threshold level.

16. The method of claim 15, further comprising determining an address of a region-of-interest (ROI) based on the motion information signal.

17. The method of claim 12, further comprising connecting a first shared floating diffusion node for a first one of the pixel groups to a second shared floating diffusion node for a second one of the pixel groups with an inter-pixel switch to transfer electrical charge from the first floating diffusion node to the second floating diffusion node.

* * * * *